United States Patent [19]

Takahashi et al.

[11] Patent Number: 5,071,593

[45] Date of Patent: * Dec. 10, 1991

[54] CONDUCTIVE AGENT FOR ELECTROSTATIC COATING OF PLASTICS AND ELECTROSTATICALLY COATED PLASTIC MOLDINGS

[75] Inventors: Katsuhiko Takahashi; Yoshiharu Suzuki, both of Fuji, Japan

[73] Assignee: Polyplastics Co., Ltd., Osaka, Japan

[ * ] Notice: The portion of the term of this patent subsequent to Sep. 12, 2006 has been disclaimed.

[21] Appl. No.: 244,152

[22] Filed: Sep. 14, 1988

[30] Foreign Application Priority Data

Sep. 25, 1987 [JP] Japan .................................. 62-241653

[51] Int. Cl.$^5$ ............................................... H01B 1/00
[52] U.S. Cl. ...................................... 252/500; 252/510; 252/511; 252/512; 252/518; 252/520; 524/495; 524/496; 524/401; 524/439; 524/413; 524/432; 524/448

[58] Field of Search ................ 252/500, 510, 511, 512, 252/518, 520; 524/495, 496, 401, 439, 413, 432, 448

[56] References Cited

U.S. PATENT DOCUMENTS 4,431,764 2/1984 Yoshizumi .
4,474,906 10/1984 Nakama et al. .
4,670,188 1/1987 Iwasa et al. .

FOREIGN PATENT DOCUMENTS 0064558 11/1982 European Pat. Off. .
2155023 9/1985 United Kingdom .

Primary Examiner—Josephine Barr
Attorney, Agent, or Firm—Nixon & Vanderhye

[57] ABSTRACT

The electrostatic coating is effectively conducted on a plastic article with use of an electrically conductive agent comprising a polyurethane and an electrically conductive filler such as inorganic fine powder and organic substances.

5 Claims, No Drawings

CONDUCTIVE AGENT FOR ELECTROSTATIC COATING OF PLASTICS AND ELECTROSTATICALLY COATED PLASTIC MOLDINGS

FIELD OF THE INVENTION

The present invention relates to a conductive agent usable as a primer in the electrostatic coating of highly crystalline plastics of the type having poor polarity. In particular, the present invention relates to a conductive agent which reliably increases the electrostatic coating efficiency, exhibits a high wetting power for the plastics to be coated, and does not inhibit the adhesion of the electrostatic coating film. The present invention further relates to plastic moldings which have been electrostatically coated using such a conductive agent.

BACKGROUND AND SUMMARY OF THE INVENTION

As is well known, the electrostatic coating method comprises applying a high-voltage direct current between an object and a spray-coating apparatus so as to form a line of electrostatic force therebetween and thereby cause a spray of charged paint to adhere to the surface of the object along the electrostatic force line. The paint consumption loss is far lower (about one-half) as compared to paint loss using conventional non-electrostatic spray-coating methods. Another advantage of electrostatic spray-coating method is that a coating film can be formed uniformly over the entire object, including shadows. The electrostatic coating method is, therefore, widely employed. When the electrostatic coating method is employed for coating a non-conductive substance such as a non-conductive plastic, a conductive agent is typically applied as a primer to the object in order to render it electrically conductive. That is, the conductive agent is applied to the surface of the non-conductive object so as to form an electrically conductive film. The electrically conductive film is thereafter charged so as to perform the electrostatic coating.

The conductive agents usable for the above-described purposes typically include, for example, various amphoteric, conductive organic substances such as quaternary ammonium salts, as well as cationic, anionic and nonionic conductive organic substances. They are usually diluted with a suitable solvent and the solution is then applied to the surface of the object to form an extremely thin primer layer prior to the electrostatic coating operation. However, known conductive agents are prepared mainly for the purpose of increasing the electrostatic efficiency but the effects thereof on the adhesion of the electrostatic coating film to the coated object have rarely been examined. In this regard, it has been found that a number of problems exist when one attempts to electrostatically coat a highly crystalline plastic having very low polarity and poor adhesion (hereinafter sometimes referred to as "problematic plastics") such as polyacetal and polyester resins. Although it is indispensable that a conductive film be applied as the primer layer when such problematic plastics are electrostatically coated, use of conventional conductive agents impart poor adhesion properties to such plastics. Even when the affinity of an electrostatic paint for the plastic is improved by suitably adjusting the paint composition, a film having a conductive layer is easily peeled from the plastic. Thus, satisfactory paint adhesion has not been obtained using conventional conductive agents in connection with problematic plastics, such as polyacetal and polyester resins.

It is therefore an object of the present invention to provide a conductive agent capable of effectively performing its intended essential functions—that is, exhibiting excellent "wettability" for problematic plastics in addition to forming a primer layer which firmly adheres an electrostatic coating film to the surface of an object formed of such problematic plastics. Another object of the present invention is to provide electrostatically spray coated moldings in which the electrostatic coating layer is firmly adhered via such a conductive agent.

According to the present invention, these objects are provided by a conductive agent for electrostatic coating which comprises as the main constituents:

(A) a polyurethane, and
(B) a conductive inorganic fine powder and/or a conductive organic substance.

Electrostatically spray coated plastic moldings which employ the above-noted conductive agent exhibit excellent paint-adhesion properties and thus overcomes many of the problems associated with the electrostatic spray-coating of problematic (crystalline) plastics.

DETAILED DESCRIPTION OF THE INVENTION

The present invention broadly provides an electrically conductive composition for use in the electrostatic spray coating of plastic articles, which comprises (A) a polyurethane resin and (B) an electrically conductive inorganic fine powder and/or an electrically conductive organic substance.

It is preferable that the component (B) is present in the composition in an effective amount so that the surface resistance is not larger than $10^{13}$ ohms.cm.

The present invention also provides a method for electrostatically coating a plastic article which comprises first coating the article with the composition as defined above and then effecting the electrostatic coating thereon. The resulting coated plastic article obtained by the method as defined above is also included within the present invention.

The minimum properties required of a conductive agent for electrostatic spray coating are as follows:

(1) it must be capable of forming a highly conductive film so as to increase the electrostatic adhesion efficiency during electrostatic spray coating;

(2) it must sufficiently wet the surface of the object to be spray coated and must form a satisfactory primer layer which exhibits excellent adhesion to both the object and electrostatic coating film to reduce film peeling, and (3) the conductive agent must neither modify nor deteriorate the object or the components of the film formed by the electrostatic coating method. Due consideration has been given to the requirements (1) and (3) and they have been satisfied considerably in the prior art. However, no detailed investigations have yet been made on requirement (2), since most of the objects that have been electrostatically spray coated were polar substances and thus their adhesion to the conductive agent was substantially not in question. The present inventors, however, have discovered that electrostatic coating of problematic crystalline plastics, such as polyacetal resin, polyethylene terephthalate, polybutylene terephthalate and aromatic polyesters, critically require a conductive agent of enhanced wettability and adhesion characteristics. Thus, when a conductive agent which exhibits poor wettability and adhesion characteristics is used in connection with problematic plastics, the layer formed by electrostatic coating is easily peeled off thereby rendering coated articles worthless. It has therefore been found that:

(1) Adhesion is typically reduced due to the presence of a conductive organic substance (which is usually a main component of conventional conductive agents) which has a surface-activating effect. Therefore, when such a substance is present on the surface of an object, the resulting film adhesion is seriously inhibited.

(2) When a suitable amount of a polyurethane resin is incorporated in the conductive agent comprising the conductive organic substance, the adhesiveness and film-forming property of the polyurethane resin per se are effectively exhibited and, in addition, the conductive organic substance is entrapped in the polyurethane resin so to control its adhesion-inhibiting property due to the surface-activating effect of the organic substance in the film-forming step.

(3) The polyurethane resin is quite highly adhesive to the film formed by the electrostatic coating and, therefore, the problematic crystalline plastics are firmly adhered to the layer formed by an electrostatic coating method via the conductive coating layer containing the polyurethane resin.

(4) Materials capable of imparting conductivity include inorganic conductive fine powders in addition to ordinarily used conductive fine powders in addition to ordinarily used conductive organic substances soluble in a solvent. Particularly, when both such conductivity-imparting materials are used together, the physical properties of the conductive coating layer are improved and the adhesion of the electrostatic coating layer is further improved.

As described above, the polyurethane resin acts as the conductive film-forming component this resin is adherable to both the object to be electrostatically spray coated, and the electrostatic coating layer. The conductive organic substance is entrapped in the polyurethane resin and, therefore, the adhesion-inhibiting property of the organic substance is controlled. When a conductive inorganic fine powder is used, the polyurethane resin also acts as a vehicle for uniformly distributing the fine powders in the coating layer. In view of all of these effects, the effective polyurethane resin has an average molecular weight of between about 2,000 to 10,000, and more preferably between about 4,000 to 7,000.

As a matter of course, the conductive inorganic fine powder and conductive organic substance are components used for making the primer layer conductive (surface resistance: below about $10^{13}\Omega\cdot cm$) in the electrostatic coating process. The conductive inorganic fine powders include, for example, conductive metal powders (including short fibers), metal-coated fillers (such as nickel-plated mica and nickel-plated glass balloons) and conductive fillers (such as conductive titanium oxide, conductive zinc white, conductive antimony trioxide and graphite). The conductive inorganic fine powder used as the conductive film constituent has preferably a very small particle size and a large specific surface area. Usually fine particles having a particle diameter of smaller than about 20 $\mu$m are used. The conductive organic substances include known solvent-soluble cationic, amphoteric, nonionic and anionic conductive organic substances. They are not particularly limited. The most common conductive organic substances are quaternary ammonium salts, alkylbetaines, alkylamines, salts of alkyl sulfates, etc.

Though the conductive inorganic fine powder and the conductive organic substance can be used alone, it is most preferred to use a combination of the same in suitable amounts for the following reasons. When the conductive inorganic fine powder is used alone, it is difficult to increase the conductivity and a considerably large amount thereof is necessitated for obtaining a satisfactory conductivity. As a result, the transparency of the coating film is reduced unfavorably. On the contrary, when the conductive organic substance is used, a transparent, highly conductive coating layer is formed but the coating layer per se is weak to such an extent that when an external peeling force is applied, cohesive failure is often caused in the conductive coating layer per se. When a combination of both is sued, the coating layer reinforcing effect of the conductive inorganic fine powder and the excellent conductivity of the conductive organic substance are effectively exhibited. By these effects coupled with the excellent adhesion and film-forming property of the polyurethane resin, the conductive coating layer thus obtained has quite excellent conductivity, adhesion and physical properties.

The compounding ratio of the conductive substance to the polyurethane resin is not particularly limited, since it varies depending on the kind of conductive substance, molecular weight of the polyurethane resin and physical properties and conductivity coating layer. Usually, however, the amounts of them used are as follows:

(A) 90 to 50 parts by weight of the polyurethane resin and 10 to 50 parts by weight of the inorganic fine powder when this powder is used singly, (B) 50 to 97.5 parts by weight of the polyurethane resin and 50 to 2.5 parts by weight of the conductive organic substance when this substance is used singly, and (C) 50 to 30 parts by weight of the polyurethane resin, 10 to 50 parts by weight of the conductive inorganic fine powder and 4 to 50 parts by weight of the conductive organic substance when a combination of the two conductive substances is used.

The conductive coating layer forming components are diluted to a concentration of usually about 60 to 95%, more usually about 70 to 90%, with aketone solvent such as methyl ethyl ketone or an alcohol solvent such as isopropyl alcohol.

If necessary, the conductive agent of the present invention can contain, in addition to the above-described components, additives such as a lubricant dispersant, precipitation inhibitor, leveling agent and colorant.

The conductive agent of the present invention is used for making the surface of a non-conductive plastic material conductive so that the electroconductive coating thereof is made possible. A thickness of the conductive layer of as thin as about 0.1 to 1 $\mu$m will suffice. The most ordinary coating method is air spraying, though immersion coating, brush coating or roll coating can also be employed. When the layer of the conductive agent is thus formed on the plastic molding, a firm coating film can be formed thereon by an ordinary electrostatic coating method to obtain the product having quite excellent appearance and surface profile.

The conductive agent of the present invention having the above-described formulation has a conductivity sufficient to allow electrostatic spray coating and also has an excellent adhesion to the problematic plastics, such as polyacetal or polyester resin. According to the present invention, problems such as peeling of the coating film of an electrostatically coated plastic, and other disadvantages caused by the peeling are solved. The advantages of the electrostatic coating can be obtained in the coating of even the plastic material which cannot be easily coated. Excellent electrodeposition products can thus be provided.

EXAMPLES

Conductive agents having compositions shown in Tables 1-(1) and 1-(2) were prepared. Each of them was applied to polyacetal resin plate, polyethylene terephthalate plate and polybutylene terephthalate plate by air spraying so that the film thickness after drying would be 1.0±0.3 μm, 5±0.5 μm, 10±2 μm, 10±2 μm or 15±5 μm, respectively, the thickness being varied depending on the kind thereof, and then air-dried.

The conductive layer forming components shown in Table 1 were as follows:
polyurethane resin: "Barnok 16-416" (a product of Dainippon Ink & Chemicals, Inc.),
quaternary ammonium salt: "Conagent H-10" (a product of Yutaka Shosha), "BYK ES-80" (a product of BYK Chemie), and "Electrostripper A" (a product of Kao Corporation),
cationic conductive organic substance: "Electrostripper QN" (Kao Corporation),
nonionic conductive organic substance: "Electrostripper EA" (Kao Corporation),
anionic conductive organic substance: "Electrostripper PC" (Kao Corporation),
Ni-plated mica: "EC-325" (Kuraray Co., Ltd.),
conductive antimony trioxide: "W-10" (Mitsubishi Metal Corporation),
conductive titanium dioxide: "500-W" (Ishihara Sangyo Kaisha Ltd.),
conductive zinc white: "23-K" (Hakusui Kagaku Co.), and
graphite: POG-10 (Sumitomo Chemical Co., Ltd.)

TABLE 1-(1)

(unit: wt. %)

| Experiment No. | 1 | 2 | 3 | 4 | 5 | 6 | 7 | 8 | 9 | 10 |
|---|---|---|---|---|---|---|---|---|---|---|
| Polyurethane resin | 6.5 | 6.3 | 6.2 | 9.0 | 6.5 | 6.5 | 6.3 | 6.2 | 9.0 | 6.5 |
| Conductive inorganic fine powder | | | | | | | | | | |
| Ni-plated mica | 6.5 | 6.3 | 6.2 | 2.0 | 6.5 | — | — | — | — | — |
| conductive antimony trioxide | — | — | — | — | — | 6.5 | 6.3 | 6.2 | 2.0 | 6.5 |
| conductive titanium dioxide | — | — | — | — | — | — | — | — | — | — |
| conductive zinc white | — | — | — | — | — | — | — | — | — | — |
| Conductive organic substance | | | | | | | | | | |
| amphoteric conductive agent | 1.0 | 4.1 | 5.3 | 9.0 | 6.5 | 1.0 | 4.1 | 5.3 | 9.0 | 6.5 |
| nonionic conductive agent | — | — | — | — | — | — | — | — | — | — |
| cationic conductive agent | — | — | — | — | — | — | — | — | — | — |
| anionic conductive agent | — | — | — | — | — | — | — | — | — | — |
| Solvent (total) | (86.0) | (84.9) | (82.3) | (80.0) | (80.5) | (86.0) | (84.9) | (82.3) | (80.0) | (80.5) |
| acetone | 43.0 | 42.5 | 41.1 | 40.0 | 40.3 | 40.3 | 42.5 | 41.1 | 40.0 | 40.3 |
| MEK | 21.5 | 21.2 | 20.6 | 20.0 | 20.1 | 20.1 | 21.2 | 20.6 | 20.0 | 20.1 |
| IPA | 21.5 | 21.2 | 20.6 | 20.0 | 20.1 | 20.1 | 21.2 | 20.6 | 20.0 | 20.1 |
| Total | 100 | 100 | 100 | 100 | 100 | 100 | 100 | 100 | 100 | 100 |

TABLE 1-(2)

(unit: wt. %)

| Experiment No. | 11 | 12 | 13 | 14 | 15 | 16 | 17 | 18 | 19 | 20 | 21 | 22 |
|---|---|---|---|---|---|---|---|---|---|---|---|---|
| Polyurethane resin | 11.7 | 5.0 | 5.5 | 5.5 | 11.7 | 5.0 | 11.7 | 5.0 | 18.0 | 10.0 | 18.0 | 10.0 |
| Conductive inorganic fine powder | | | | | | | | | | | | |
| Ni-plated mica | — | — | — | — | — | — | — | — | — | — | — | — |
| conductive antimony trioxide | — | — | — | — | — | — | — | — | — | — | — | — |
| conductive titanium dioxide | — | — | — | — | — | — | — | — | 2.0 | 10.0 | — | — |
| conductive zinc white | — | — | — | — | — | — | — | — | — | — | 2.0 | 10.0 |
| Conductive organic substance | | | | | | | | | | | | |
| amphoteric conductive agent | 0.3 | 5.0 | 2.8 | 3.6 | — | — | — | — | — | — | — | — |
| nonionic conductive agent | — | — | — | — | 0.3 | 5.0 | — | — | — | — | — | — |
| cationic conductive agent | — | — | — | — | — | — | 0.3 | 5.0 | — | — | — | — |
| anionic conductive agent | | | | | | | | | | | | |
| Solvent (total) | (88.0) | (90.0) | (91.7) | (90.9) | (88.0) | (90.0) | (88.0) | (90.0) | (80.0) | (80.0) | (80.0) | (80.0) |
| acetone | 44.0 | 45.0 | 45.9 | 45.5 | 44.0 | 45.0 | 44.0 | 45.0 | 40.0 | 40.0 | 40.0 | 40.0 |
| MEK | 22.0 | 22.5 | 22.9 | 22.7 | 22.0 | 22.5 | 22.0 | 22.5 | 20.0 | 20.0 | 20.0 | 20.0 |
| IPA | 22.0 | 22.5 | 22.9 | 22.7 | 22.0 | 22.5 | 22.0 | 22.5 | 20.0 | 20.0 | 20.0 | 20.0 |
| Total | 100 | 100 | 100 | 100 | 100 | 100 | 100 | 100 | 100 | 100 | 100 | 100 |

The plastic plates on which the conductive layer had been thus formed were then subjected to the electrostatic coating under conditions which will be described below. A uniform coating film could be formed by the electrostatic coating method in all cases. The adhesion of the electrostatic coating film to the plastic plate was quite excellent and no peeling was recognized at all in the cross-cut adhesion test with a tape.

On the contrary, when the polyurethane resin-free conductive agent was used, the electrostatic coating film was easily peeled off from the conductive film surface, though the electrostatic coating per se could be conducted easily.

Electrostatic coating agents:
(1) Primer: Primer DP-A (patent pending) for Duracon (trade name),
(2) Face coating: Amilac 371-531 White (Kansai Paint Co., Ltd.).

Electrostatic painting conditions:
R-E-A gun (Ransburg Gema Co., Ltd.)
Cross-cut adhesion test:
1 mm cross-hatching; peeling with a cellophane tape (100 squares of a size of 1×1 mm).

We claim:

1. An electrically conductive electrostatic coating composition for plastic articles, comprising a mixture of (A) a polyurethane resin having an average molecular weight of between about 2,000 to 10,000, and (B) an electrically conductive additive in an amount sufficient to achieve a surface resistance of the composition of not greater than about $10^{13}$ $\Omega \cdot cm$, said electrically conductive additive being at least one selected from the group consisting of (i) electrically conductive inorganic powders having a particle size of less than 20 μm and selected from the group consisting of conductive metal powders, metal-coated fillers, titanium oxide, conductive zinc white, conductive antimony trioxide, and graphite, and (ii) electrically conductive organic substances selected from the group consisting of amphoteric, nonionic and anionic conductive organic substances.

2. A composition as in claim 1, wherein said electrically conductive organic substance is at least one selected from the group consisting of quaternary ammonium slats, alkylbetaines, alkylamines, and salts of alkyl sulfates.

3. A composition as in claim 1 wherein said electrically conducive inorganic fine powder is the sole electrically conductive additive and is present in an amount between 10 to 50 parts by weight, and wherein said polyurethane resin is present in an amount of 90 to 50 parts by weight.

4. A composition as in claim 1 wherein said electrically conductive organic substance is the sole electrically conductive additive and is present in am amount between 50 and 2.5 parts by weight, and wherein said polyurethane resin is present in an amount of 50 to 97.5 parts by weight.

5. A composition as in claim 1 wherein both said electrically conductive inorganic powder and organic substance are resent in said composition, and wherein said electrically conductive inorganic powder is present in an amount of between 10 to 50 parts be weight, said electrically conductive organic substance is present in an amount between 4 and 50 parts by weight, and said polyurethane resin is present in an amount of 50 to 30 parts be weight.

* * * * *

UNITED STATES PATENT AND TRADEMARK OFFICE
CERTIFICATE OF CORRECTION

PATENT NO.   : 5,071,593

DATED        : December 10, 1991

INVENTOR(S)  : TAKAHASHI et al

It is certified that error appears in the above-identified patent and that said Letters Patent is hereby corrected as shown below:

On the Title page,
Under "ABSTRACT", first line, before "electrostatic" delete "The".
line one change "electrostatic" to --Electrostatic--.
Column 1, line 58, after "hereinafter " change "sometime" to --sometimes--.

Column 4, line 17, after "is" change "sued" to --used--;
        line 30, after "amounts" delete "of them".

Column 8, line 18, after "are" change "resent" to --present--;
        line 20, after "parts" change "be" to --by--;
        line 24, after "parts" change "be" to --by--.

Signed and Sealed this

Fifteenth Day of June, 1993

Attest:

MICHAEL K. KIRK

Attesting Officer     Acting Commissioner of Patents and Trademarks